United States Patent [19]

Gringeri et al.

[11] Patent Number: 6,108,382

[45] Date of Patent: Aug. 22, 2000

[54] METHOD AND SYSTEM FOR TRANSMISSION OF VIDEO IN AN ASYNCHRONOUS TRANSFER MODE NETWORK

[75] Inventors: Steven Gringeri, Foxboro; E. Evert Basch, Stow; Vijay Kumar Samalam, Sudbury; Bhumip Khasnabish, Waltham; Roman V. Egorov, Cambridge, all of Mass.

[73] Assignee: GTE Laboratories Incorporated, Waltham, Mass.

[21] Appl. No.: 09/019,923

[22] Filed: Feb. 6, 1998

[51] Int. Cl.[7] .................................................. H04N 7/12
[52] U.S. Cl. ........................... 375/240; 348/384; 348/17; 348/390
[58] Field of Search .................................... 348/384, 390, 348/6, 12–17, 400–402, 409–410, 415–416; 455/4.1–4.2, 5.1, 6.1; 370/395, 905; 375/240

[56] References Cited

U.S. PATENT DOCUMENTS

| | | | |
|---|---|---|---|
| 5,541,852 | 7/1996 | Eyuboglu et al. | 370/60 |
| 5,550,577 | 8/1996 | Verbiest et al. | 348/7 |
| 5,619,500 | 4/1997 | Hiekali | 370/414 |
| 5,668,841 | 9/1997 | Haskell et al. | 348/500 |
| 5,680,483 | 10/1997 | Tranchard | 382/239 |

OTHER PUBLICATIONS

Khasnabish et al, "Traffic Shaping Issues for Carrying Variable Rate MPEG–2 over rt–VBR", ATM Forum Technical Working Group Members Traffic Management, pp. 1–7, Feb. 1997.

Gringeri et al, "Traffic Analysis of Variable Rate MPEG–1 and MPEG–2 Video", ATM Forum Technical Working Group Members Traffic Management, pp. 1–16, Jul. 1997.

Egorov et al, "VBR Contract Parameters for Variable Rate MPEG–2", ATM Forum Technical Working Group Members Traffic Management, pp. 1–11, Sep. 1997.

Gringeri et al, "Transmission of Variable Bit–Rate MPEG–2 Video Streams over ATM: Applications, Challenges, and Techniques".

Samalam et al, "Work Item on Variable Rate MPEG–2", ATM Forum Technical Working Group Members Traffic Management, pp. 1–6, Sep. 1997.

Gringeri et al, "Tranmission of MPEG–2 Video Stream over ATM", pp. 1–11.

Gringeri et al, "Customizing the MPEG Standards for Military Applications", pp. 1–6.

Davie, "An ATM Network Interface for High–Speed Experimentation", Bell Communications Research, IEEE, pp. 1–4.

Trajkovski et al, "A Comparison of Two Buffer Occupancy Control Algorithms in ATM Networks", IEEE, pp. 18–25, Feb. 1999.

*Primary Examiner*—Vu Le
*Attorney, Agent, or Firm*—Leonard Charles Suchyta

[57] ABSTRACT

A method and system for transmitting a video stream in an asynchronous transfer mode (ATM) network comprises steps of encoding the video into an MPEG-2 variable bit rate video stream, shaping the encoded variable bit rate video stream to conform to the traffic contract parameters for a Variable Bit Rate (VBR) connection in the network, and transmitting the shaped variable bit rate video stream on the VBR connection based on the traffic contract parameters. For a given network bandwidth, switch buffer space, and equivalent video quality, the network can statistically multiplex a larger number of variable bit rate video streams by maximizing the utilization of the network bandwidth and switch buffer space that the network allocates to each video stream.

9 Claims, 6 Drawing Sheets

METHOD AND SYSTEM FOR TRANSMISSION OF VIDEO IN AN ASYNCHRONOUS TRANSFER MODE NETWORK

BACKGROUND OF THE INVENTION

1. Field of the Invention

The present invention relates to transmission of video and audio, and more particularly, to transmission of variable bit rate video and audio over asynchronous transfer mode networks.

2. Background of the Art

To store and deliver digital video in a cost effective fashion, an application must have the capability to compress the number of bits in the video. This is, in part, because the available bandwidth for delivery of digital video is usually far narrower than that required for delivery of uncompressed video. For example, the National TV Standardization Committee (NTSC) describes a broadcast quality video as one that has a resolution of 720 Horizontal by 480 Vertical pixels/frame and transmission rate of 29.97 frames/second. As a result, a broadcast quality video typically generates a bit rate in the range of 100 to 300 Mega bits/second. The addition of audio to the video further increases the bit rate of the uncompressed stream. Therefore, at a bit rate in the range of 100 to 300 Mega bits/second, 15 seconds of uncompressed video clip could occupy up to 575 Mega bytes of disk space, which is far too much for most desktop computers to dedicate to such a short video clip.

An encoder follows a set of steps, known as an encoding process, to compress a digital video and/or its associated audio. This process, however, is not standardized and may vary from application to application depending upon the application's requirements and the complexity of the video. As a result, an encoder can optimize the encoding process to meet the specific bandwidth and video quality requirements of an application. Typically, a broadcast quality compressed video may have a peak rate of 1.5 Mega bits/second to 15 Mega bits/second.

The Motion Picture Experts Group (MPEG) has defined standards, known as MPEG-2, which are described in "ISO/IEC 13818, ITU-T," 1994. MPEG-2 describes the syntax and the semantics for decoding encoded digital video and audio. MPEG-2 defines five profiles and four levels. Each profile describes the basic configuration and/or complexity of the encoding and decoding methods, and each level classifies image sizes and identifies the ranges of parameters for controlling the encoded video bit rate. Of the five profiles and the four levels, the combination of a main level and main profile defines a broadcast quality video. For this combination, an encoder can vary the bit rate by dynamically adjusting the number of bits per frame.

An MPEG-2 encoder can encode a video by exploiting the spatial and temporal redundancies of frames in the video. The encoder uses the spatial redundancy of a frame to encode the frame independent of any other frame in the video. In addition, the encoder provides further compression by taking advantage of the fact that consecutive frames of a video are often similar to each other. To take advantage of this temporal redundancy, the encoder simply encodes the difference between two or more consecutive frames instead of encoding each frame separately.

Specifically, an MPEG-2 encoder encodes each video frame into one of three types of frames: Intracoded (I) frames, Predictive Coded (P) frames, and bidirectionally predicted (B) frames. The encoder compresses a frame into an I frame by using a Discrete Cosine Transform (DCT). The encoder compresses the frame without taking into account the redundancy, if any, between the frame and its adjacent frames. The encoder compresses a frame into a P frame, however, by encoding the difference between the frame and its previous frame. Similarly, the encoder compresses a frame into a B frame by encoding the difference between the frame and its previous and next frames. The encoder then groups several I, B, and P frames into a set pattern to form a Group of Pictures (GOP).

Commercially available MPEG-2 encoders support a wide range of transmission and storage applications by using both constant bit rate and variable bit rate encoding. A constant bit rate encoder uses a rate control buffer, known as a video buffer verifier (VBV), to maintain a constant bit rate at the output of the encoder. The fullness of VBV dictates the quantization level and hence the number of bits per frame used in macro-block and slice layers of the encoding process. The encoder maintains a constant bit rate at its output irrespective of the amount of bits needed for encoding each frame of the video. Specifically, to achieve a nearly constant bit rate, the encoder varies the quantization resolution of the video based on the complexity of the video and the fullness of the VBV. Furthermore, to achieve an exact constant bit rate, the encoder may need to perform bit stuffing when the encoder generates a smaller number of bits than the desired constant bit rate.

Constant bit rate encoding has two notable disadvantages. Because of varying quantization, the resulting encoded video generally does not have constant quality throughout the video. More importantly, in transmission applications over a network, an application can not make efficient use of the available network bandwidth and switch buffer space since the encoder may generate excess traffic due to unnecessarily high quantization resolution and/or bit stuffing.

Variable bit rate encoding is commonly used in storage applications such as Digital Versatile Discs (DVDs). Unlike a constant bit rate encoder, a variable bit rate encoder generates a variable bit rate encoded video at the output of the encoder. The bit rate of the encoded video depends on the complexity of each scene, the degree of motion, and the number of scene changes. As a result, a variable bit rate encoded video generally is bursty in nature. The bursty nature of a variable bit rate encoded video can result in an inefficient use of network bandwidth and switch buffer space resources in transmission applications. To achieve constant video quality and to maximize efficient use of network bandwidth and switch buffer space, variable bit rate video applications must control the burstiness of variable bit rate encoded videos.

Known methods for controlling the burstiness of encoded variable bit rate video are 1) source rate control, 2) network feedback rate control, and 3) encoder output shaping. The source rate control method sets the quantizer scale globally at the frame level or lower, and adjusts the encoding bit rate by varying the quantization scale of different frame types in the video. This method has the disadvantage that, in transmission applications, the encoder must re-encode the entire video to conform the bit rate of the video to the network traffic parameters each time an application wishes to transmit the encoded video under a different network traffic conditions, and thus, requires substantial re-processing.

The network feedback rate control method uses feedback information (in the form of signaling information) from the network to readjust the bit rate of the encoded video. The network feedback information generally identifies the availability of network bandwidth and switch buffer space. Because of time delay in receiving the feedback information from the network, this method is not as effective as the source rate control method for controlling the burstiness of a variable bit rate video. Furthermore, this method requires implementation of additional network signaling information, which increases implementation costs.

The encoder output shaping method adjusts the bit rate of an encoded video to conform to network bandwidth and switch buffer space availability. This method does not have the disadvantages of the source rate control because an encoded video can be transmitted to multiple destinations and under different network traffic conditions without re-encoding the video. Although the general concept of shaping an encoded video is well known, methods and/or systems for shaping an encoded variable bit rate MPEG-2 video for transmission in an asynchronous transfer mode (ATM) network are not known.

In an ATM network, a source node transmits information in the form of fixed sized cells to a destination node through a connection (referred to as a virtual circuit) established between the source node and the destination node. The source node and destination node may be a set-top-box, video equipment, facsimile, computer, edge-router, edge-switch, etc. The cells may include any type of digitized information, including video, audio, data, multimedia, etc.

When establishing a virtual circuit through an ATM network, a source node can select one of five different categories of service: Constant Bit rate (CBR), Variable Bit Rate—Real Time (VBR-RT), Variable Bit Rate—Non Real Time (VBR-NRT), Available Bit Rate (ABR), and Unspecified Bit Rate (UBR). "ATM Traffic Management Specifications v. 4.0," 1996, describes each of these services.

A source node negotiates a traffic contract for a CBR connection to a destination node by specifying a peak cell rate (PCR), the maximum cell rate that the source node can transmit on the connection. CBR service is ideal for applications where the source node generates a constant rate video. However, CBR service is not well suited for variable bit rate video applications because these applications, due to their bursty nature, do not transmit at the negotiated PCR during the entire duration of the video. As a result, these applications do not use the entire bandwidth that the network allocates to a CBR connection. Thus, the network cannot efficiently allocate network bandwidth resources to variable bit rate video applications that use CBR connections.

VBR service, however, is better suited for efficient allocation of network bandwidth and switch buffer space resources to variable bit rate video applications. Specifically, a source node negotiates a traffic contract for a VBR connection to a destination node by specifying a PCR, sustained cell rate (SCR), and a maximum burst size (MBS). SCR is the average cell rate that the source node can transmit on the connection. MBS is the maximum number of consecutive cells that a source can transmit at PCR on the connection.

In a VBR connection, the cell rate can exceed SCR for short periods constrained by MBS, but the connection maintains the SCR as the average rate. A VBR connection provides a guaranteed quality of service regarding cell loss and bandwidth availability as long as the cell traffic meets the negotiated traffic contract.

For transmission of already encoded variable bit rate video on a VBR connection, the source rate control method has the disadvantage that the encoder must re-encode the entire video to conform the bit rate of the video to the traffic contract parameters PCR, SCR, and MBS each time an application wishes to transmit the encoded video, and thus, requires substantial re-processing.

Likewise, the use of network feedback rate control method for transmitting an encoded variable bit rate video on a VBR connection has the disadvantage that an application must re-negotiate the traffic contract parameters PCR, SCR, and MBS during the life of a VBR connection. Furthermore, because of the time delay in receiving feedback information from the network, the application cannot effectively control the burstiness of a variable bit rate video. Finally, the network feedback rate control method requires implementation of additional ATM network signaling information, which increases implementation costs.

Therefore, it is desirable to have a method and system for transmitting an encoded variable bit rate MPEG-2 video on a VBR connection in an ATM network that does not have the above-mentioned disadvantages. Furthermore, it is desirable to maximize the number of video streams that the network can support for a given network bandwidth, switch buffer space, and video quality.

SUMMARY OF THE INVENTION

The present invention comprises a method and a system for transmitting video in an ATM network by encoding the video stream into a variable bit rate MPEG-2 video stream, shaping the encoded variable bit rate video stream to conform to the traffic contract parameters for a (VBR) connection in the network, and transmitting the variable bit rate video stream on the VBR connection based on the traffic contract parameters.

The present invention further comprises a method and a system for transmitting a variable bit rate MPEG-2 video stream in an ATM network by identifying a plurality of averaging intervals in the video stream, determining a peak cell rate (PCR) and an average cell rate for each averaging interval, determining a set of sustained cell rate (SCR) by adjusting the SCR between the average cell rate and PCR while keeping PCR fixed for each averaging interval, determining a maximum burst size (MBS) for each SCR, selecting one of the MBSs and its corresponding SCR, and establishing a connection specified by the peak cell rate, the selected sustained cell rate, and the corresponding maximum burst size.

With methods and systems consistent with the present invention, an ATM network can efficiently allocate network bandwidth and switch buffer space to a number of variable bit rate video streams. By maximizing the utilization of the allocated network bandwidth and switch buffer space, the network can statistically multiplex a larger number of variable bit rate video streams over VBR connections for the same video quality.

The summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

DETAILED DESCRIPTION

The following description of embodiments of this invention refers to the accompanying drawings. Where appropriate, the same reference numbers in different drawings refer to the same or similar elements.

Methods and systems consistent with the present invention shape an encoded variable bit rate video stream to conform to the traffic contract parameters for a VBR connection in an ATM network and transmit the shaped variable bit rate video stream on the VBR connection based on the traffic contract parameters. Specifically, methods and systems consistent with the present invention shape the encoded variable bit rate video stream by determining an averaging interval with an optimum VBR traffic contract. When variable bit rate video streams are shaped in accordance with the present invention, for a given network bandwidth, switch buffer space, and equivalent video quality, the ATM network can statistically multiplex a larger number of variable bit rate video streams, and thus, maximizing network utilization.

Figure 1:
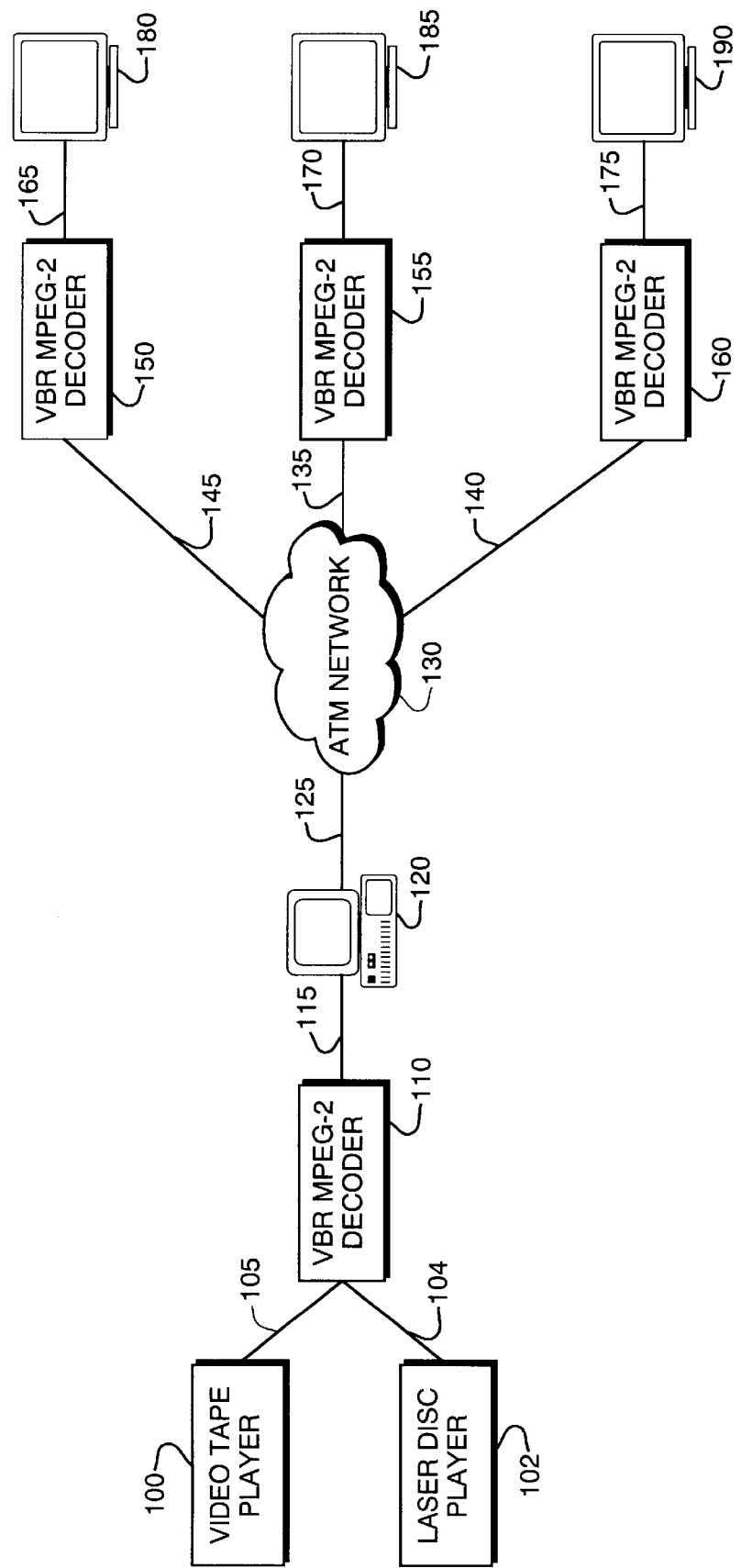
FIG. 1 illustrates a system for transmitting variable bit rate MPEG-2 video in an ATM network in accordance with an embodiment of the invention.

FIG. 1 illustrates a system for transmitting variable bit rate MPEG-2 video in an ATM network in accordance with an embodiment of the invention. As shown, video sources, for example, video tape player 100 and laser disc player 102, connect to encoder 110 via cables 104 and 105, respectively. Encoder 110 connects to computer 120 via cable 115. Computer 120 communicates with one end of ATM network 130 via transmission link 125. Decoders 150, 155, and 160 interface with the other end of ATM network 130 via transmission links 145, 135, and 140, respectively. Decoders 150, 155, and 160 connect to video monitors 180, 185, and 190 via cables 165, 170, and 175, respectively.

Video tape player 100 generates a video from, for example, an NTSC video source, and transmits the video to encoder 110. Encoder 110, which, for example, includes a C-Cube CL4040 VideoRISC-3 chip-set, encodes the generated video into variable bit rate MPEG-2 format. Encoder 110 uses, for example, a two-pass method to encode a variable bit rate video stream: profiling the video on the first pass and encoding the video on a second pass. The particular encoding method is not essential to the practice of the invention, as encoder 110 can use, for example, a single-pass method to encode a variable bit rate video stream.

Encoder 110 encodes the video at, for example, main profile and main level. Alternatively, encoder 110 can encode the video at other profiles and levels depending upon the desired quality of the video. Encoder 110 operates with, for example, inverse telecine turned off for the NTSC video source and scene detection turned off to generate a fixed length Group Of Pictures (GOP). Encoder 110 encodes the video for a resolution of, for example, 720 Horizontal by 480 Vertical (720H×480V) pixels/frame and a frame rate of 29.97 frames/second.

Figure 2:
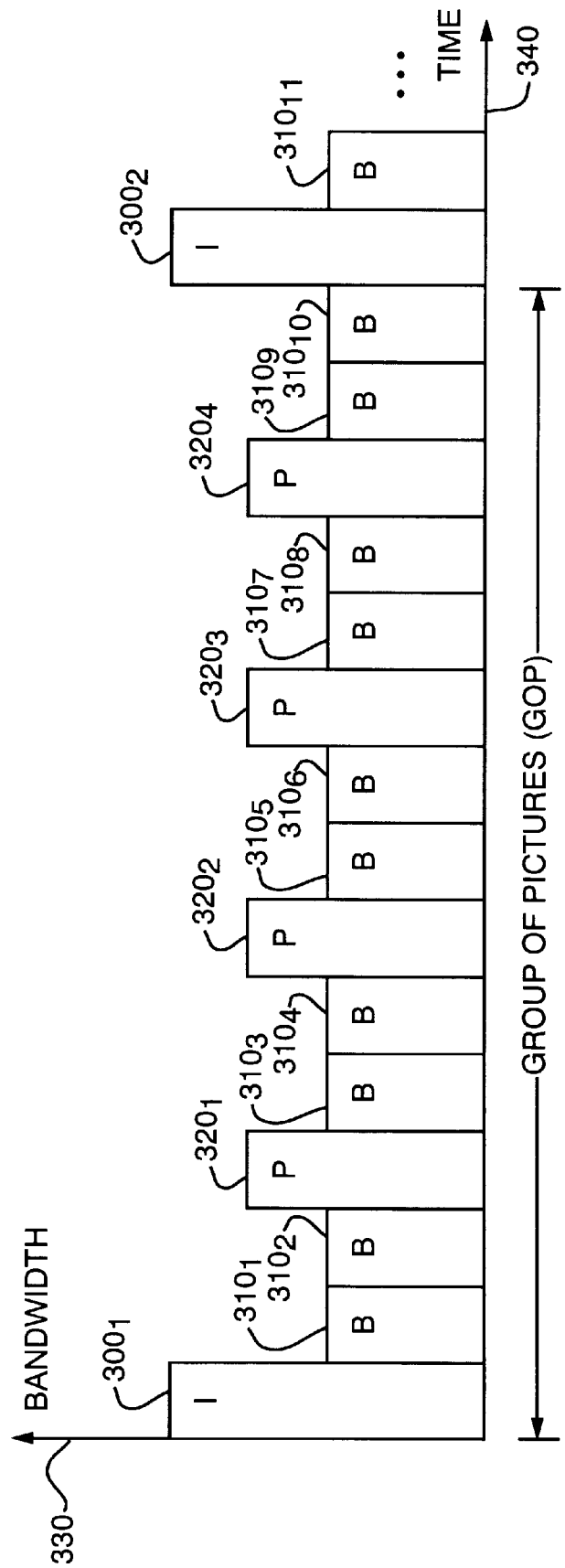
FIG. 2 illustrates a variable bit rate MPEG-2 video stream in accordance with an embodiment of the invention.

FIG. 2 illustrates the encoded variable bit rate MPEG-2 video at the output of encoder 110 in accordance with an embodiment of the invention. In the encoded video, encoder 110 sets a GOP structure of, for example, 15 frames (i.e., N=15), which includes 1 intracoded (I) frame, 4 predicted (P) frames, and 10 bidirectional (B) frames. The GOP structure has 2 B frames between each I frame and P frame and between each 2 P frames (i.e., M=3). As shown, the first GOP includes I frame $300_1$, P frames $320_1$, $320_2$, $320_3$, and $320_4$, and B frames $310_1$ through $310_{10}$.

To generate a broadcast quality encoded video, encoder 110 can set a peak bit rate and an average rate in the range of 1.5 Mega bits/second to 15 Mega bits/second. In the embodiment shown in FIG. 1, encoder 110 sets a peak rate of, for example, 6 Mega bits/second over each GOP with an average rate of 3 Mega bits/second over the entire duration of the video stream. After encoding the entire video stream, encoder 110 transmits the encoded video stream to computer 120 via cable 115.

Figure 3:
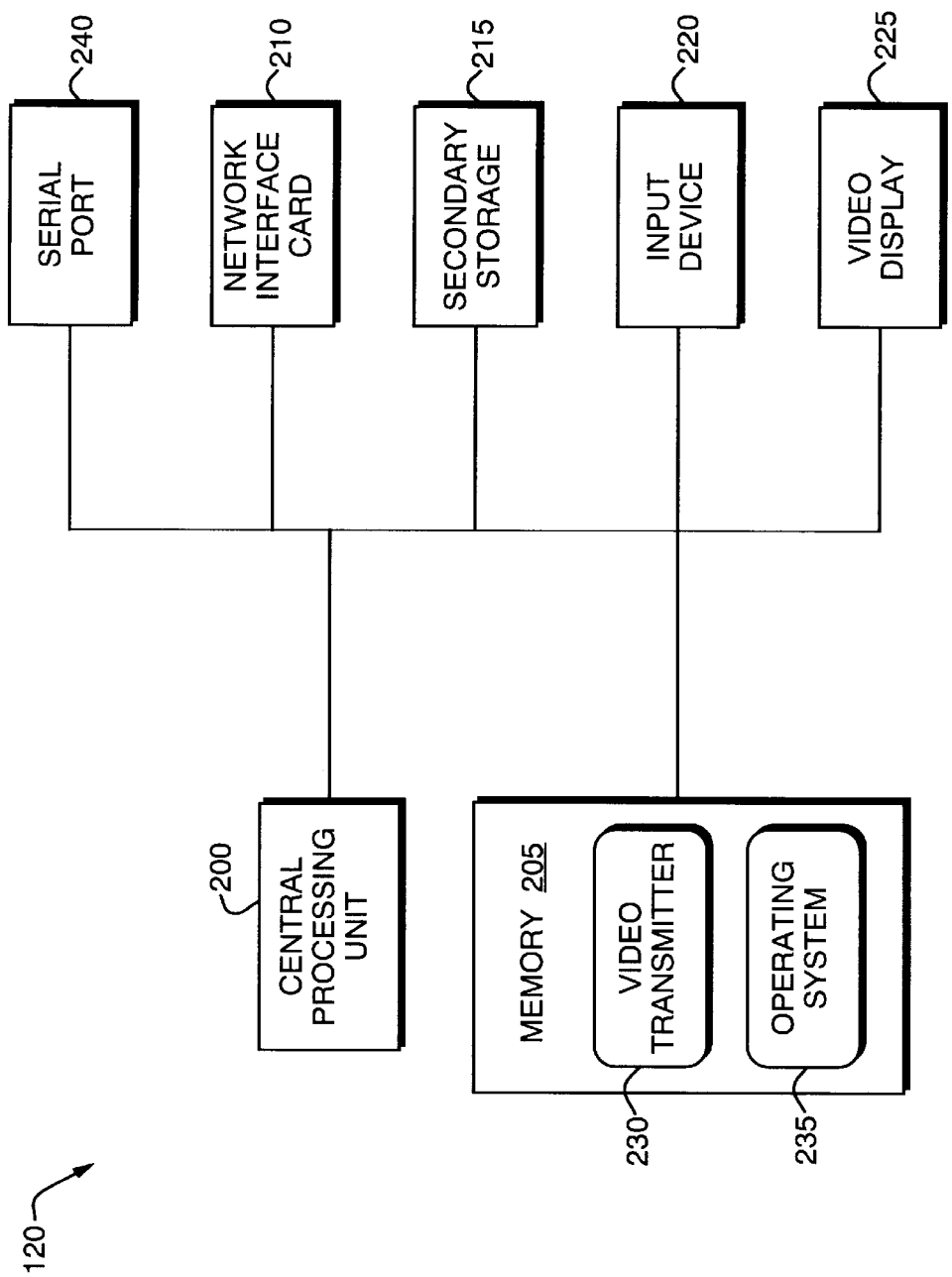
FIG. 3 illustrates a block diagram of an apparatus for shaping and transmitting variable bit rate MPEG-2 video in accordance with an embodiment of the invention.

FIG. 3 illustrates a block diagram of computer 120 in accordance with an embodiment of the invention. Computer 120 is, for example, a Hewlett Packard Vectra™ personal computer and includes central processing unit (CPU) 200, memory unit 205, secondary storage 215, input device 220, video display 225, ATM network interface card (NIC) 210, and serial input port 240. Memory unit 205 includes operating system 235 and video transmitter (VTRANS) 230 in form of executable code, which CPU 200 executes. Alternatively, one of ordinary skill in the art can implement any portion or all of VTRANS 230 using known hardware and/or firmware technologies and can implement VTRANS 230 as part of, for example, encoder 110.

Computer 120 receives the encoded variable bit rate MPEG-2 video from encoder 110 at serial input port 240. Computer 120 stores the encoded video in secondary storage 215. VTRANS 230 then reads the encoded video stream into memory unit 205, shapes, and transmits the encoded video stream through network 130 to, for example, decoders 150, 155, and 160.

Figure 4:
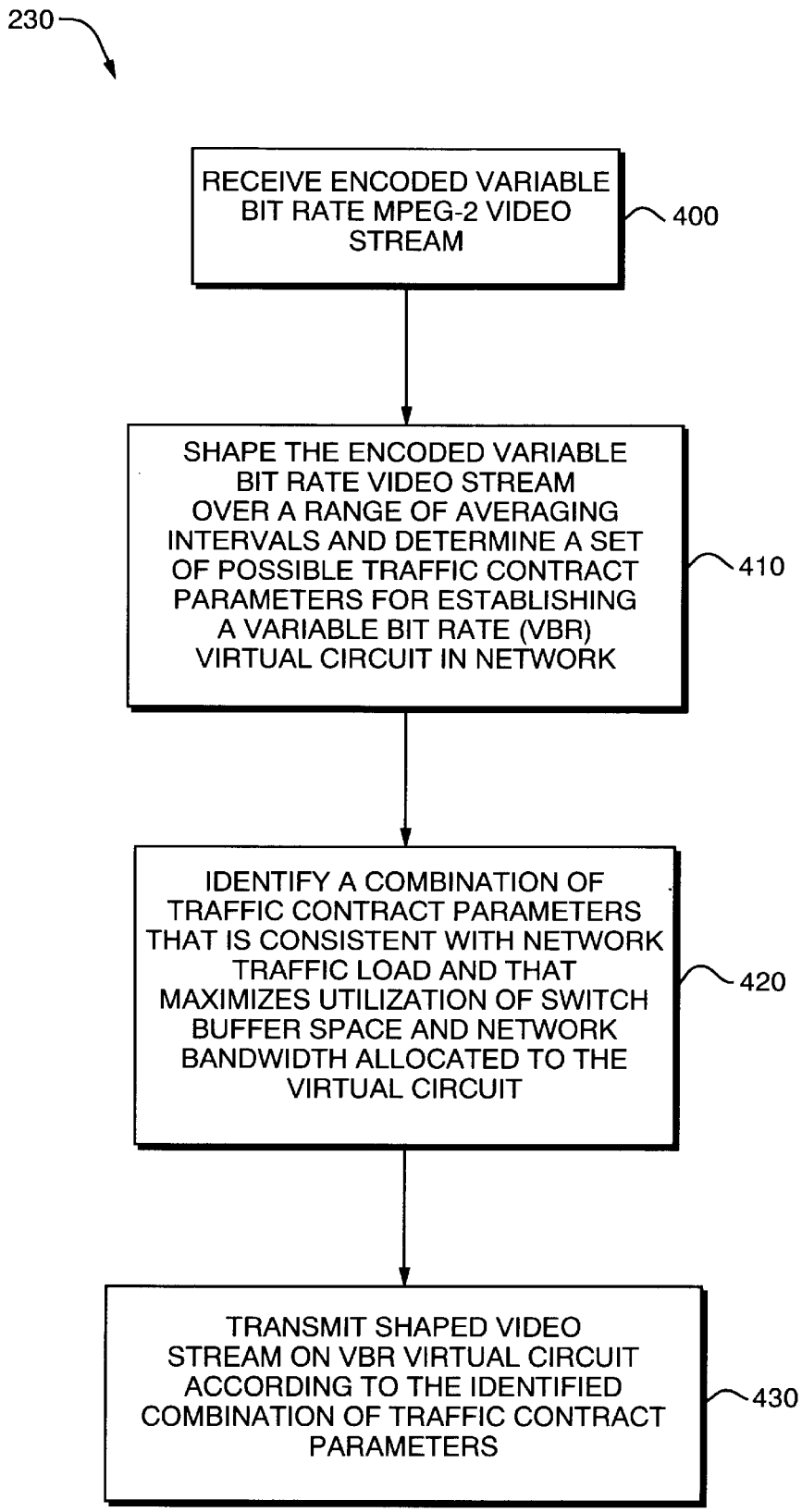
FIG. 4 illustrates a flow chart of the steps for transmitting variable bit rate MPEG-2 video over a Variable Bit Rate virtual circuit in accordance with an embodiment of the invention.

FIG. 4 illustrates the steps that video transmitter (VTRANS) 230 performs to transmit the encoded variable bit rate MPEG-2 video over ATM network 130. VTRANS 230 receives the encoded variable bit rate video (step 400). VTRANS 230, as shown below in detail, shapes the encoded variable bit rate video over a range of averaging intervals, and determines a set of possible traffic contract parameters for establishing a Variable Bit Rate (VBR) virtual circuit in ATM network 130 (step 410). VTRANS 230 then, as shown below in detail, identifies from the set of possible traffic parameters a combination of traffic parameters that is consistent with the traffic load in network 130 and that maximizes utilization of network bandwidth and switch buffer space that network 130 allocates to the virtual circuit (step 420). VTRANS 230 then transmits the shaped, encoded variable bit rate video according to the identified combination of traffic parameters (step 430).

Figure 5:
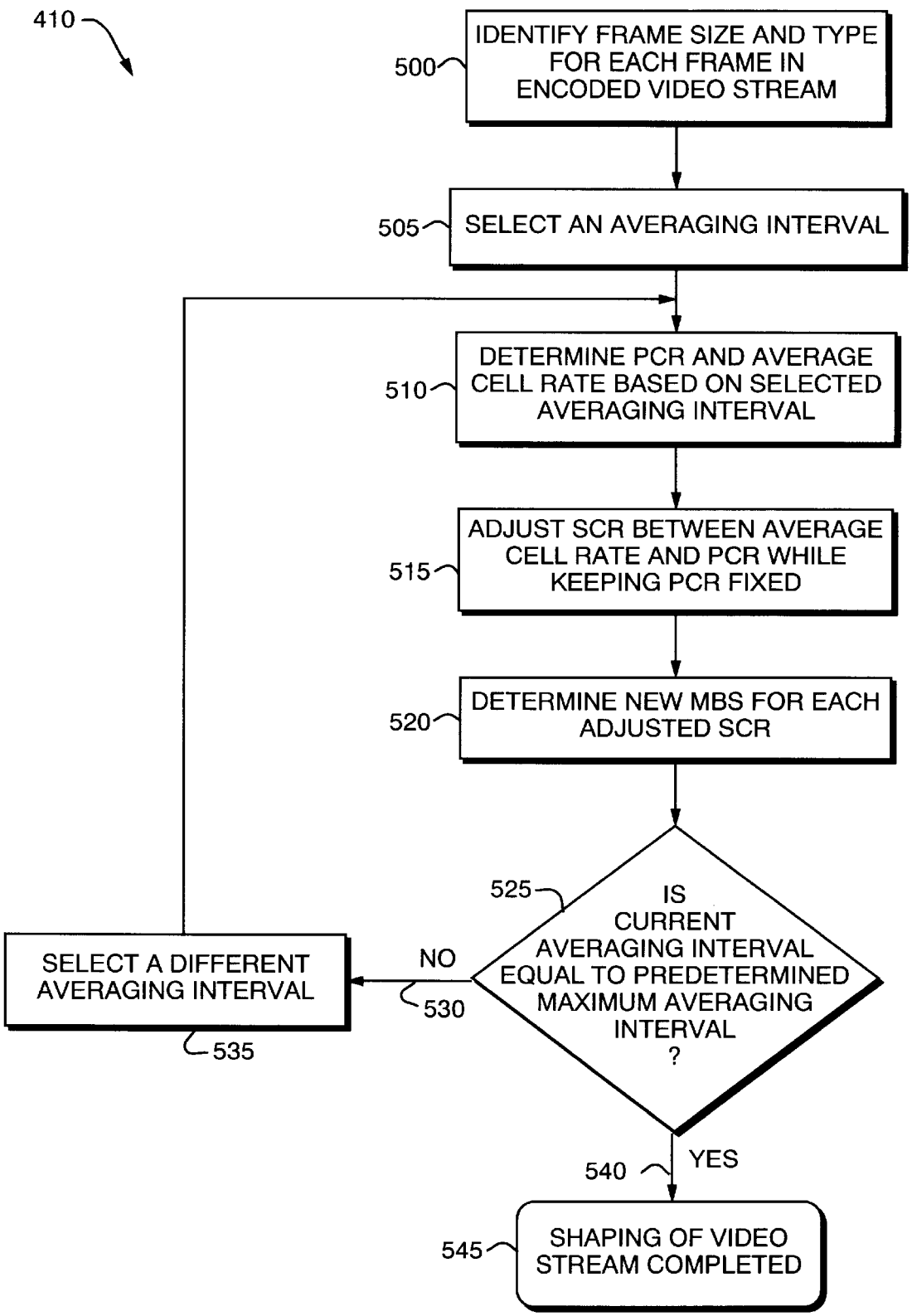
FIG. 5 illustrates a flow chart of the steps for shaping variable bit rate MPEG-2 video for transmission on a Variable Bit Rate virtual circuit in accordance with an embodiment of the invention.

FIG. 5 illustrates a flow chart of the steps that VTRANS 230 performs to shape the encoded variable bit rate video for transmission on a Variable Bit Rate virtual circuit in network 130. VTRANS 230 scans the entire encoded video and identifies the frame size (i.e., the number of bits) and the frame type (i.e, I, B, P frame) for each frame in the encoded video (step 500). VTRANS 230 stores this information in static memory in memory unit 205. Alternatively, VTRANS 230 can store this information in a file.

VTRANS 230 then selects an averaging interval, for example, the length of a frame (e.g., $\frac{1}{29.97}$ seconds) in the encoded video (step 505). VTRANS 230 divides the entire encoded video into a plurality of averaging intervals. Based on the selected averaging interval, VTRANS 230 determines a PCR and an average cell rate (step 510). Specifically, VTRANS 230 divides the number of bits in each averaging interval by the length of each averaging interval to determine a bit rate for each averaging interval. VTRANS 230 then uses the largest bit rate to determine a PCR. VTRANS 230 divides the total number of bits in the encoded video by the total length of the encoded video to determine the average bit rate of the video. VTRANS 230 then uses the average bit rate to determine an average cell rate for the encoded video.

VTRANS 230 then identifies a set of SCRs by adjusting the SCR between the average cell rate and PCR while keeping PCR fixed (step 515). VTRANS 230 identifies the set of SCRs by using, for example, a weighted average method, which can be expressed as follows:

$$SCR=(1-x)*(\text{average cell rate})+x*PCR,$$

where $0 \leq x \leq 1$. VTRANS 230 increments x starting from 0 in, for example, 0.2 increments, and determines a new SCR for each x. Alternatively, the increments of x can be smaller or larger depending upon the particular application. Furthermore, VTRANS 230 can use other weighted average methods known to one of ordinary skill in the art. For each newly identified SCR, VTRANS 230 determines a corresponding MBS (step 520) by using, for example, the Generic Cell Rate Algorithm (GCRA) defined in "ATM Traffic Management Specifications v. 4.0," 1996. Alternatively, if network 130 supports a cell rate method other than GCRA, VTRANS 230 can instead use the particular cell rate method supported by the network. VTRANS 230 then saves each new SCR and its corresponding MBS in static memory.

VTRANS 230 determines whether the current averaging interval is equal to a predetermined maximum averaging interval (step 525). Depending upon the largest MBS that network 130 can support, the predetermined maximum averaging interval can be, for example, 1 GOP. If VTRANS 230 determines that the current averaging interval is not equal to the predetermined maximum averaging interval (step 530), VTRANS 230 then selects a different averaging interval, for example, the length of 2 frames (step 535). VTRANS 230 then repeats steps 510 through 525 as explained above for the new averaging interval, and saves each new SCR and its corresponding MBS for the particular averaging interval in static memory. When VTRANS 230 determines that the current averaging interval is equal to the predetermined maximum averaging interval (step 540), VTRANS 230 has shaped the encoded video stream based on each averaging interval and has identified a set of possible traffic contracts for each averaging interval (step 545).

Figure 6:
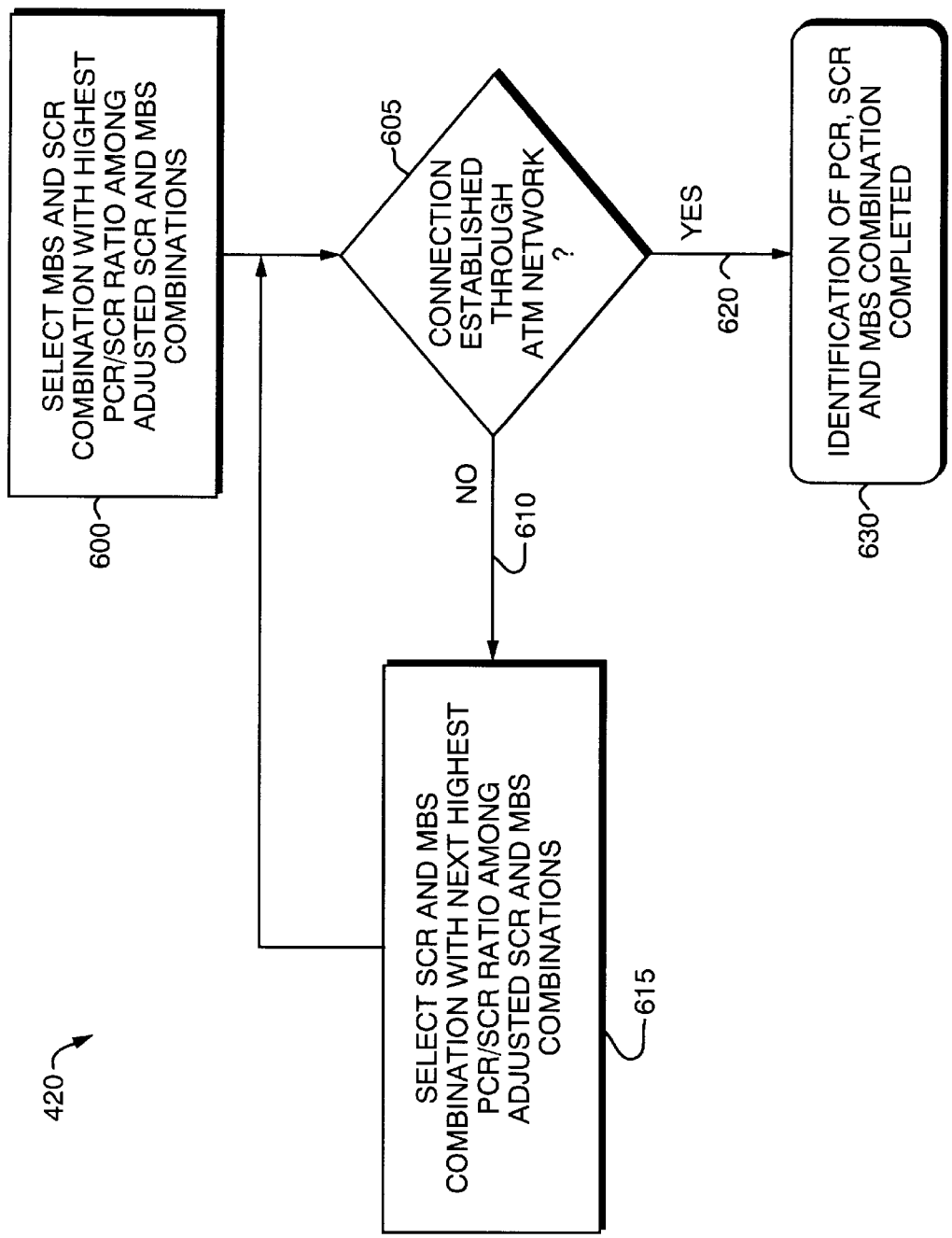
FIG. 6 illustrates a flow chart of the steps for identifying a combination of traffic contract parameters for transmission of variable bit rate MPEG-2 video on a Variable Bit Rate virtual circuit in accordance with an embodiment of the invention.

FIG. 6 illustrates a flow chart of the steps that VTRANS 230 performs to select a SCR and MBS combination from the set of SCR and MBS combinations determined for the different averaging intervals. From the set of SCR and MBS combinations, VTRANS 230 selects an SCR and MBS combination that has the highest PCR/SCR ratio and that satisfies the cell delay and cell delay variation limits for the desired video quality (step 600). VTRANS 230 selects an SCR and MBS combination such that the cell transfer delay and cell delay variation are less than, for example, 100 msec and 4 msec, respectively. Alternatively, depending upon the particular application and the desired video quality, VTRANS 230 can use different cell transfer delay and/or cell delay variation limits in selecting an MBS.

VTRANS 230 then requests from network 130, for example, an ATM Adaptation Layer 5 (AAL-5) real time Variable Bit Rate (VBR) connection (step 605). Alternatively, VTRANS 230 can request a non-real time VBR connection. In case of a real time VBR connection, VTRANS 230 specifies that the connection support the PCR and the selected SCR and MBS combination. If network 130 denies the requested connection (step 610), VTRANS 230 selects a different SCR and MBS combination that has the next highest PCR/SCR ratio and that satisfies the cell transfer delay and cell delay variation limits for transmitting broadcast quality video (step 615).

If network 130 sets up a connection in form of a virtual circuit according to PCR and the selected SCR and MBS combination (step 620), then VTRANS 230 has successfully identified a PCR, SCR, and MBS for transmitting the encoded video stream through network 130 while maximizing utilization of the network bandwidth and switch buffer space that network 130 allocates to the virtual circuit (step 630). VTRANS 230 then starts to transmit the encoded video stream on the virtual circuit according to the identified PCR and the selected SCR and MBS combination.

In another embodiment, computer 120 receives a plurality of variable bit rate encoded video streams (not shown) from encoder 110. VTRANS 230 first determines a PCR and a set of SCR and MBS combinations for each averaging interval for each video stream as explained herein. However, in this embodiment, for each video stream, VTRANS 230 selects an MBS and SCR combination that yields the lowest effective bandwidth. Effective bandwidth is defined as the amount of bandwidth that network 130 allocates to a video stream in order to meet a pre-specified cell loss probability (CLP) and cell delay variation. VTRANS 230 determines the effective bandwidth by using any of the methods known to one of ordinary skill in the art. Computer 120 then transmits the shaped video streams simultaneously over network 130 based on the PCR and the selected MBS and SCR combinations.

For further information related to methods and systems consistent with the present invention, the following appendices are incorporated herein by reference:

[1] Traffic Shaping Issues For Carrying Variable Rate MPEG2 Over rt-VBR, ATM 97-0118, B. Khasnabish, V. Samalam, S. Gringeri, A. Lewis, and B. Basch

[2] Traffic Analysis Of Variable Rate MPEG1 And MPEG2 Video, ATM 97-0549, S. Gringeri, B. Khasnabish, A. Jimenez-Rivera, R. Egorov, V. Samalam, A. Lewis, and B. Basch

[3] Work Item On Variable Rate MPEG2, ATM 97-0732, V. Samalam, R. Egorov, S. Gringeri, B. Khasnabish, A. Lewis, and B. Basch

[4] VBR Contract Parameters For Variable Rate MPEG2, ATM 97-0733, R. Egorov, S. Gringeri, V. Samalam, B. Khasnabish, A. Lewis, and B. Basch

[5] Transmission Of Variable Bit-Rate MPEG2 Video Streams Over ATM: Applications, Challenges, And Techniques, S. Gringeri, A. Jimenez-Rivera, B. Khasnabish, R. Egorov, A. Lewis, and B. Basch

[6] Customizing The MPEG Standards For Military Applications, S. Gringeri, A. Lewis, R. Egorov, B. Khasnabish, and B. Basch,
GTE Laboratories Incorporated
Thomas K. Mills, Army Research Laboratory
Khaled Shuaib, City College of New York

[7] Transmission Of MPEG-2 Video Streams Over ATM, S. Gringeri, B. Khasnabish, A. Lewis, K. Shuaib, R. Egorov, and B. Basch While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for transmitting a video in an asynchronous transfer mode (ATM) network, said method comprising the steps of:
    a) encoding the video into a variable bit rate video;
    b) shaping the encoded variable bit rate video for transmission on a Variable Bit Rate (VBR) connection in the network; and
    c) transmitting the shaped variable bit rate video on the connection.

2. The method of claim 1, wherein the shaping step further comprises the steps of:
    a) identifying a plurality of averaging intervals in the encoded variable bit rate video; and
    b) determining a peak cell rate (PCR) and an average cell rate for each of the averaging intervals.

3. The method of claim 2, wherein the shaping step further comprises the steps of:
    a) determining a plurality of sustained cell rates (SCR) for each of the averaging intervals;
    b) determining maximum burst sizes (MBS) for the sustained cell rates respectively; and
    c) selecting one of the maximum burst sizes and the respective sustained cell rate.

4. A system for transmitting a video in an asynchronous transfer mode (ATM) network, comprising:
    a) an encoder for encoding the video into a variable bit rate video; and
    b) a video transmitter for shaping the encoded variable bit rate video for transmission on a Variable Bit Rate (VBR) connection in the network and transmitting the shaped variable bit rate video on the connection.

5. A method for transmitting a variable bit rate video stream in an asynchronous transfer mode (ATM) network, said method comprising the steps of:
    a) identifying a plurality of averaging intervals in the variable bit rate video stream;
    b) determining a peak cell rate (PCR) and an average cell rate for each of the averaging intervals;
    c) determining a plurality of sustained cell rates (SCR) for each of the averaging intervals;
    d) determining maximum burst sizes (MBS) for the sustained cell rates respectively;
    e) selecting one of the maximum burst sizes and the respective sustained cell rate; and
    f) establishing a network connection defined by the peak cell rate, the selected maximum burst size, and the selected sustained cell rate.

6. The method of claim 5, wherein the selecting step further comprises the step of determining a ratio of the peak cell rate to each of the sustained cell rates for each of the averaging intervals.

7. The method according to claim 5, wherein the selecting step further comprises the step of determining a cell transfer delay for the selected maximum burst size.

8. The method according to claim 5, wherein the selecting step further comprises the step of determining a cell delay variation for the selected maximum burst size.

9. A computer-readable medium capable of configuring a computer to perform a method for transmitting a variable bit rate video stream in an asynchronous transfer mode (ATM) network, said method comprising the steps of:
    a) identifying a plurality of averaging intervals in the variable bit rate video stream;
    b) determining a peak cell rate (PCR) and an average cell rate for each of the averaging intervals;
    c) determining a plurality of sustained cell rates (SCR) for each of the averaging intervals;
    d) determining maximum burst sizes (MBS) for the sustained cell rates respectively;
    e) selecting one of the maximum burst sizes and the respective sustained cell rate; and
    f) establishing a network connection defined by the peak cell rate, the selected maximum burst size, and the selected sustained cell rate.

* * * * *